United States Patent
Chung et al.

(10) Patent No.: US 9,274,781 B2
(45) Date of Patent: Mar. 1, 2016

(54) DISPLAY DEVICE CAPABLE OF UPGRADING SMART FUNCTIONS AND METHOD FOR CONTROLLING THE SAME

(71) Applicant: LG ELECTRONICS INC., Seoul (KR)

(72) Inventors: Wooseong Chung, Pyeongtaek-si (KR); Jaehan Park, Pyeongtaek-si (KR); Chongsok Kim, Pyeongtaek-si (KR)

(73) Assignee: LG ELECTRONICS INC., Seoul (KR)

(*) Notice: Subject to any disclaimer, the term of this patent is extended or adjusted under 35 U.S.C. 154(b) by 58 days.

(21) Appl. No.: 13/650,534

(22) Filed: Oct. 12, 2012

(65) Prior Publication Data
US 2013/0263108 A1    Oct. 3, 2013

(30) Foreign Application Priority Data
Apr. 2, 2012 (KR) .......................... 10-2012-0034063

(51) Int. Cl.
  G06F 9/445 (2006.01)
  H04N 21/418 (2011.01)
  H04N 21/422 (2011.01)
  (Continued)

(52) U.S. Cl.
CPC .............. *G06F 8/65* (2013.01); *H04N 21/4181* (2013.01); *H04N 21/4183* (2013.01); *H04N 21/4184* (2013.01); *H04N 21/4351* (2013.01); *H04N 21/818* (2013.01); *H04N 21/8173* (2013.01); *H04N 21/8186* (2013.01); *H04N 21/42222* (2013.01)

(58) Field of Classification Search
None
See application file for complete search history.

(56) References Cited

U.S. PATENT DOCUMENTS

| | | | | |
|---|---|---|---|---|
| 5,678,135 A | * | 10/1997 | Fukui et al. | 399/77 |
| 7,051,325 B2 | * | 5/2006 | Choi et al. | 717/168 |
| 7,181,665 B2 | * | 2/2007 | Son | 714/742 |

(Continued)

FOREIGN PATENT DOCUMENTS

| CN | 101123676 A | 2/2008 |
|---|---|---|
| CN | 101548540 A | 9/2009 |

OTHER PUBLICATIONS

Costa, L., et al., Over the Air Download for Digital Television Receivers Upgrade, IEEE Transactions on Consumer Electronics, vol. 56, Issue: 1, Feb. 2010, pp. 261-268, [retrieved on Oct. 28, 2015], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Ked & Associates, LLP

(57) ABSTRACT

A display device capable of upgrading smart functions as broadly described herein may include a multi-functional display device capable of upgrading smart functions, including a broadcast receiver for receiving a broadcast signal, a demultiplexer for demultiplexing the received broadcast signal, a decoder for decoding the demultiplexed broadcast signal, a display for displaying the decoded broadcast signal, an external device interface configured to connect to a smart card for receiving upgrade data, a memory for storing the upgrade data and version information of the smart card, and a controller configured to process and display the received broadcast signal on the display, determine whether the smart card is connected to the display device, and communicate with the smart card to operate the multi-functional display device, wherein the smart card includes at least one smart function for execution on the multi-functional display device.

11 Claims, 14 Drawing Sheets

(51) Int. Cl.
*H04N 21/435* (2011.01)
*H04N 21/81* (2011.01)

(56) References Cited

U.S. PATENT DOCUMENTS

| | | | |
|---|---|---|---|
| 7,908,401 B2* | 3/2011 | Chang | 709/250 |
| 8,330,861 B2* | 12/2012 | Lee | 348/552 |
| 8,345,052 B1* | 1/2013 | Diard | 345/502 |
| 2002/0120885 A1 | 8/2002 | Choi et al. | |
| 2005/0034028 A1* | 2/2005 | Son | 714/43 |
| 2005/0198673 A1* | 9/2005 | Kit | H04N 21/4181 725/68 |
| 2009/0298478 A1 | 12/2009 | Tyhurst et al. | |
| 2010/0005502 A1* | 1/2010 | Onozawa | G06F 8/65 725/133 |
| 2010/0153233 A1* | 6/2010 | Shin et al. | 705/27 |
| 2010/0205275 A1* | 8/2010 | Yu | H04N 21/4351 709/217 |
| 2011/0093845 A1* | 4/2011 | Kwak | 717/173 |
| 2011/0107235 A1* | 5/2011 | Woo | H04N 21/42222 715/748 |
| 2011/0141232 A1* | 6/2011 | Tsukagoshi | G06F 8/65 348/43 |
| 2012/0079473 A1* | 3/2012 | Watanabe | G06F 8/65 717/170 |
| 2012/0081607 A1* | 4/2012 | Kitazato | 348/552 |
| 2013/0135528 A1* | 5/2013 | Nicu | 348/552 |
| 2015/0135251 A1* | 5/2015 | Thomas | H04N 21/4184 725/134 |

OTHER PUBLICATIONS

Gabe, G., How to Upgrade Your HDTV Firmware—and Get Rid of Annoying Audio and Video Problems, G-Squared Interactive, 2010, 6 pages, [retrieved on Oct. 28, 2015], Retrieved from the Internet: <URL:http://www.hmtweb.com/imd/?p=1768>.*
European Search Report dated Dec. 17, 2012.

* cited by examiner

FIG. 10A
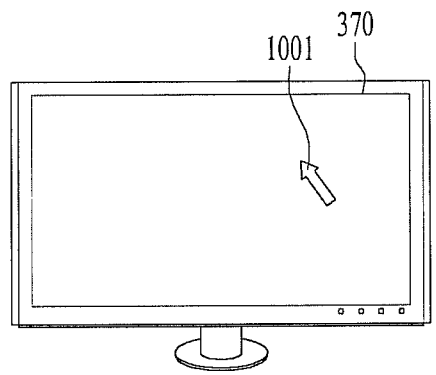
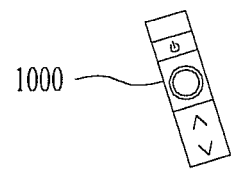
FIG. 10B
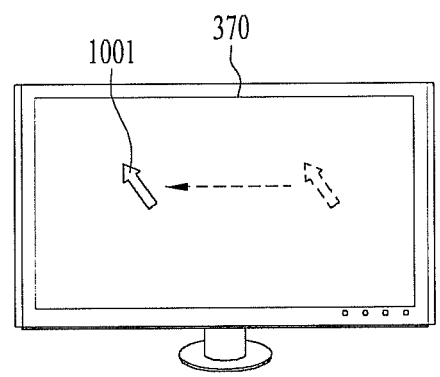
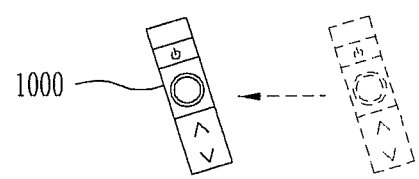

DISPLAY DEVICE CAPABLE OF UPGRADING SMART FUNCTIONS AND METHOD FOR CONTROLLING THE SAME

CROSS-REFERENCE TO RELATED APPLICATION(S)

This application claims priority under 35 U.S.C. §119 to Korean Application No. 10-2012-0034063 filed in Korea on Apr. 2, 2012, whose entire disclosure is hereby incorporated by reference.

BACKGROUND

1. Field

A display device having smart functions and method of controlling and upgrading the same are disclosed herein.

2. Background

Display devices having smart functions and methods for controlling and upgrading the same are known. However, they suffer from various disadvantages.

BRIEF DESCRIPTION OF THE DRAWINGS

The embodiments will be described in detail with reference to the following drawings in which like reference numerals refer to like elements wherein:

FIGS. 10A to 10C illustrate a display device and a remote controller for controlling the display device according to an embodiment of the present disclosure;

DETAILED DESCRIPTION

Figure 1:
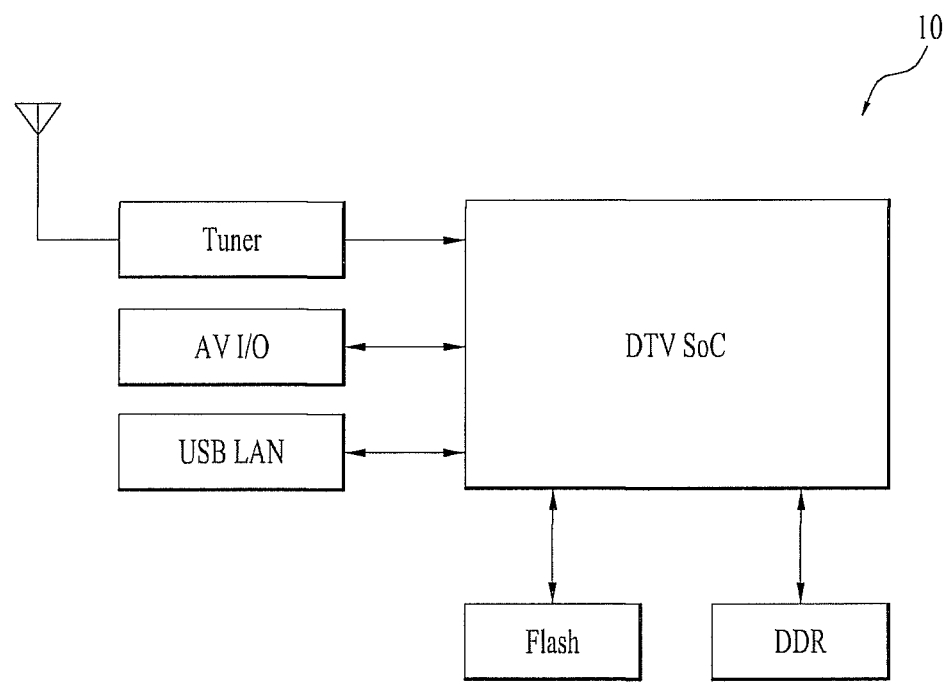
FIG. 1 is a block diagram of a display device that executes basic digital TV functions according to one embodiment of the present disclosure.

Although embodiments of the present disclosure will be described in detail with reference to the accompanying drawings and content of the drawings, the present disclosure is not limited or restricted by such embodiments.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

A display device according to the present disclosure receives an analog broadcast signal and a digital broadcast signal and displays images corresponding to the received broadcast signals. A smart card may be connected to the display device to provide additional functionality in addition to the broadcast reception function. The smart card may also be used to upgrade the display device to execute updated functions.

The terms "module," "unit" or "part" used to signify components are used herein merely to aid in understanding of the components, and thus they should not be considered as having specific meanings or roles. Accordingly, the terms "module," "unit" or "part" may be used interchangeably.

A display device may be a multi-functional display device such as a network TV, smart TV, hybrid broadcast broadband television (HBBTV), Internet TV, web TV, Internet protocol television (IPTV), etc. The display device, for example, a digital TV receiver, may process and display not only a broadcast signal received through a satellite or a cable but also video or audio data provided by various external devices such as a video cassette recorder (VCR), a digital versatile disc (DVD) player, a personal computer (PC), a set-top box (STB), etc., which are connected thereto. The external devices (e.g., STB) may be integrated into the display. Display devices may also access a server through a network and process data or content provided by the server.

Although display related technologies are rapidly being developed, it may be difficult to upgrade the display device with these performance improvements after the purchase of the display device. A conventional display device may be upgraded through after-sale service. However, technical knowledge and additional equipment may be required to perform the upgrade. Moreover, in the case of an upgradeable display device, it may be necessary to newly generate an upgrade tool for each model of the upgradeable display device whenever the version of the upgradeable display device is updated. Therefore, development costs for upgrade may increase over time.

A display device and method for controlling the same as broadly disclosed and embodied herein addresses these and other limitations. The display device may be upgraded after purchase. The display device may be easily upgraded using a smart card of an updated version by connecting the smart card to the display device. Accordingly, the display device may be easily upgraded with little to no technical knowledge or additional equipment by connecting an upgrade device to the display device. Moreover, an upgradeable display device may minimize upgrade costs.

FIG. 1 is a block diagram of a display device 10 that executes basic digital TV functions according to one embodiment of the present disclosure. As shown in FIG. 1, the display device 10 may be configured to provide only the broadcast reception function. That is, the display device 10 is not connected to a smart card to provide added functionality.

Here, the display device 10 may receive both an analog broadcast signal and a digital broadcast signal.

Figure 2:
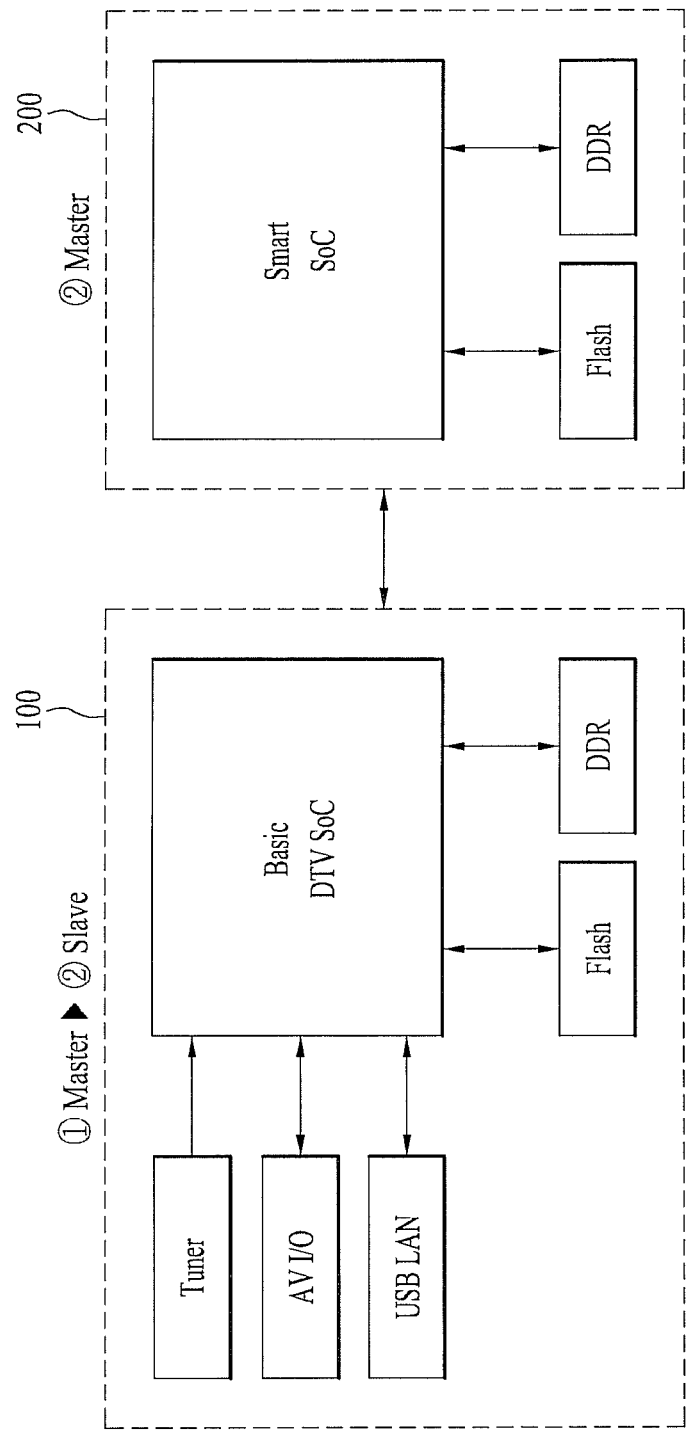
FIG. 2 is a block diagram of a display device having a basic digital TV function and a smart TV function, according to one embodiment of the present disclosure.

FIG. 2 is a block diagram of a display device having a basic digital TV function and a smart TV function according to one embodiment of the present disclosure. The basic function and the smart TV functions may be separated, as illustrated. A smart card 200 may be connected to a display device 100 that executes only the broadcast reception function in order to provide additional functionality to the display device 100 in addition to the broadcast reception function. In this case, it is possible to update the display device 100 to an updated version by maintaining the smart card 200 with an updated version.

Furthermore, once a system-on-chip (SoC) of the display device 100 that does not have smart functions and an SoC of a smart card for executing the smart functions are developed, has updated version of the display device can be produced by upgrading only the smart card. Hence, the SoC of the display device 100 can be used for a longer period of time without becoming outdated. In addition, the smart card may be assigned authority to control all functions relating to the upgrade of the smart functions, and thus complexity of software of the display device can be prevented from increasing.

The display device 100 connected with the smart card 200 corresponds to an intelligent network TV having a computer-support function and an Internet function in addition to the broadcast reception function and can include convenient interfaces such as a handwriting type input unit, a touchscreen, a spatial remote controller, etc. Furthermore, the display device 100 can access the internet and a computer to provide e-mail, web browsing, banking and game services to users since the display device 100 can support a wired or wireless Internet function. A standardized general-purpose operating system (OS) may be used to execute the above various functions. Various applications can be freely added to or deleted from a general-purpose OS kernel in the display device described in embodiments of the present disclosure, and thus the display device can execute a variety of user-friendly functions.

Figure 3:
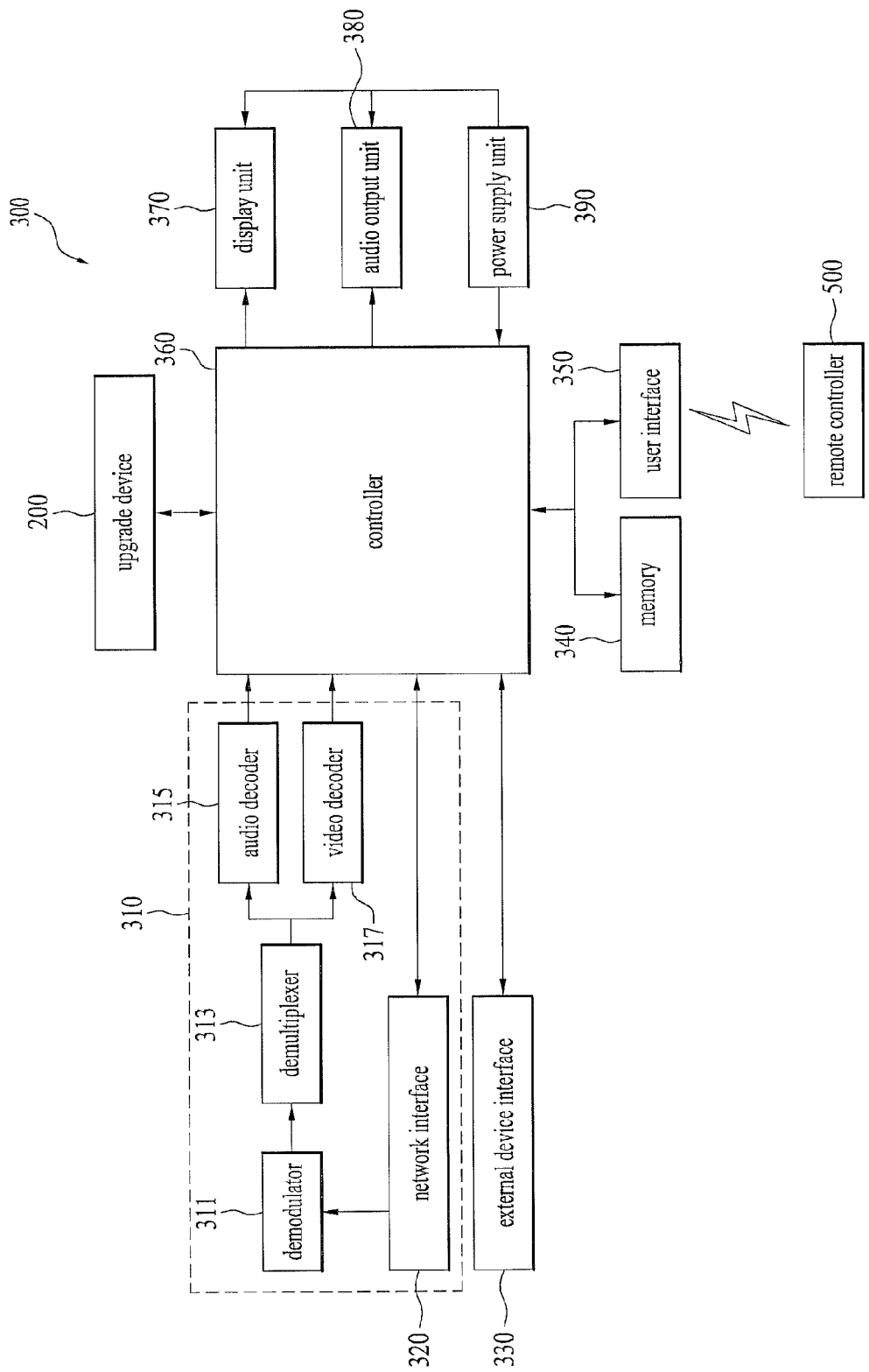
FIG. 3 is a block diagram of a display device capable of upgrading smart functions according to one embodiment of the present disclosure.

FIG. 3 is a block diagram of a display device capable of upgrading smart functions according to one embodiment of the present disclosure. It should be appreciated that the configuration of modules as shown in FIG. 3 are illustrative and one or more of the modules may be deleted or a new module may be added as necessary.

In embodiments of the present disclosure, the smart functions include all functions that can be used in a smart TV in addition to the broadcast reception function. For example, the smart functions can include a function of using a computer and the Internet through a wired/wireless Internet and a function of using various applications installed in the display device.

A display device 300 may include a broadcast receiver 310, a network interface 320, an external device interface 330, a memory 340, a user interface 350, a controller 360, a display unit 370, an audio output unit 380, and a power supply unit 390. In addition, the display device 300 may include an upgrade device 200 which may be physically separate from the display device 300. The upgrade device may be a smart card or another appropriate type of device. Simply for ease of description, the upgrade device is referred to be a smart card hereinafter.

The broadcast receiver 310 may include a demodulator 311, a demultiplexer 313, an audio decoder 315, a video decoder 317, and the network interface 320. The broadcast receiver 310 may be designed to include the demodulator 311 and the demultiplexer 313 without the network interface 320 or it may include the network interface 320 without the demodulator 311 and the demultiplexer 313.

The network interface 320 may receive a broadcast signal including audio data and video data and may include a tuner. The tuner can select a radio frequency (RF) broadcast signal(s) corresponding to a channel selected by a user or all previously stored channels from among RF broadcast signals received through an antenna.

The network interface 320 may include an Ethernet terminal, for example, to access a wired network. In addition, the network interface 320 can use communication protocols such as wireless LAN (WLAN) (Wi-Fi), wireless broadband (WiBro), world interoperability for microwave access (WiMax), high speed downlink packet access (HSDPA), etc., for wireless network access. Furthermore, the network interface 320 can select a desired application from within open applications to receive the selected application.

The demodulator 311 may receive a digital IF signal converted by the network interface 320 or the tuner and demodulates the digital IF signal. The demultiplexer 313 may demultiplex audio data and video data included in the demodulated signal. The demultiplexed audio data may be decoded by the audio decoder 315 and the demultiplxed video data may be decoded by the video decoder 317.

The decoded audio data and video data may be input to the controller 360. The controller 360 may perform an additional process on the audio data and video data input thereto, and then output an image corresponding to the video data through the display unit 370 and output sound corresponding to the audio data through the audio output unit 380.

The external device interface 330 may be connected to an external device and a network device. To achieve this, the external device interface 330 may include an A/V input/output unit or a wireless communication unit. The external device interface 330 can be connected to external devices such as a digital versatile disc (DVD) player, a Blu-ray disc (BD) player, a game console, a camera, a camcorder, a computer (notebook computer), etc., in a wired/wireless manner. Furthermore, the external device interface 330 can receive an application or an application list, which may be stored in a remote device, and deliver the application or application list to the controller 360 or the memory 340. Moreover, the external device interface 330 can receive upgrade data from the smart card 200 and transmit the upgrade data to the memory 340 or the controller 360.

The upgrade data can include an upgrade program required to improve and correct firmware that is necessary for control and management of hardware after shipment, such as OSD correction, new audio device effect, standby power reduction algorithm, software bug correction or the like. In addition, the upgrade data can include information about hardware additionally supported by the smart card 200 and control data for controlling the hardware. Furthermore, the upgrade data can include additional information containing version information of the smart card 200.

The external device interface 330 may include an Ethernet terminal, for example, to access a wired network. In addition, the network interface 320 can use communication protocols such as Wi-Fi, WiBro, WiMax, HSDPA, etc. for wireless network access. Furthermore, the external device interface 330 can select a desired application from within open applications to retrieve the selected application.

The memory 340 may be configured in the form of an electrically erasable programmable read-only memory (EEPROM) and may store programs for signal processing and control in the controller 360 or processed video, audio and data signals. The memory 340 may perform a function of temporarily storing a video, audio or data signal input from the external device interface 330 or the network interface 320. Furthermore, the memory 340 may store an application or an application list, input from the external device interface 330, the network interface 320 or the like.

In addition, the memory 340 may store the upgrade data received by the external device interface 330 and the version information of the smart card 200. If the display device 300 is released without the smart card 200, the memory 340 may set an upgrade device version as a default value such that the version information of the smart card 200 can be compared with the default value when the smart card 200 is connected to the display device 300.

The user interface 350 may transmit a signal input by the user to the controller 350 or deliver a signal from the controller 360 to the user. For example, the user interface 350 can receive input signals such as a power on/off signal, a channel selection signal, a screen setting signal, etc., from a remote controller 500 according to various communication schemes, such as an RF communication scheme or an IR communication scheme, and process the received input signals, or transmit a control signal from the controller 360 to the remote controller 500.

The controller 360 may be configured to automatically recognize whether the smart card 200 is connected to the display device according to plug & play or receive a signal representing connection of the smart card 200 from the external device interface 330. Upon recognition of connection of the smart card 200 to the display device 300, the controller 360 may verify the version of the smart card 200, determine that the display device 300 needs to be upgraded if the smart card 200 has an updated version, and controls operation of the smart card 200.

The display unit 370 may convert a video signal, a data signal or an OSD signal processed by the controller 360, or a video signal or a data signal received from the external device interface 330 into an RGB signal to generate a driving signal. The display unit 370 may be a PDP, an LCD, an OLED, a flexible display, a 3D display or another appropriate type of display. The display unit 370 can directly receive upgraded content or graphics data from the smart card 200 and may display the received content or data.

The audio output unit 380 may receive an audio signal processed by the controller 360, for example, a stereo signal, a 3.1-channel signal, a 5.1-channel signal, or the like, and may output the received signal as sound. The audio output unit 380 can be implemented as one of a variety of speakers.

The power supply unit 390 supplies power to the display device 300. For example, the power supply unit 390 can provide power to the controller 360 that can be configured in the form of an SoC, the display unit 370 for displaying images, and the audio output unit 380 for outputting audio.

The remote controller 500 may transmit user input to the user interface 350. To achieve this, the remote controller 500 can use Bluetooth, RF communication, IR communication, Ultra Wideband (UWB), ZigBee, etc. The remote controller 500 will be described in more detail with reference to FIGS. 10 and 11.

The smart card 200 can include hardware or software capable of upgrading the hardware or software of the display device 300. The smart card 200 may removably connected to the display device 300. The hardware or software may be installed in the form of firmware in the smart card 200. The smart card 200 may include at least one of content for improving the smart function in the display device 300, control data for controlling the smart function or graphics data. Moreover, the smart card 200 may be implemented on an SoC.

Figure 4:
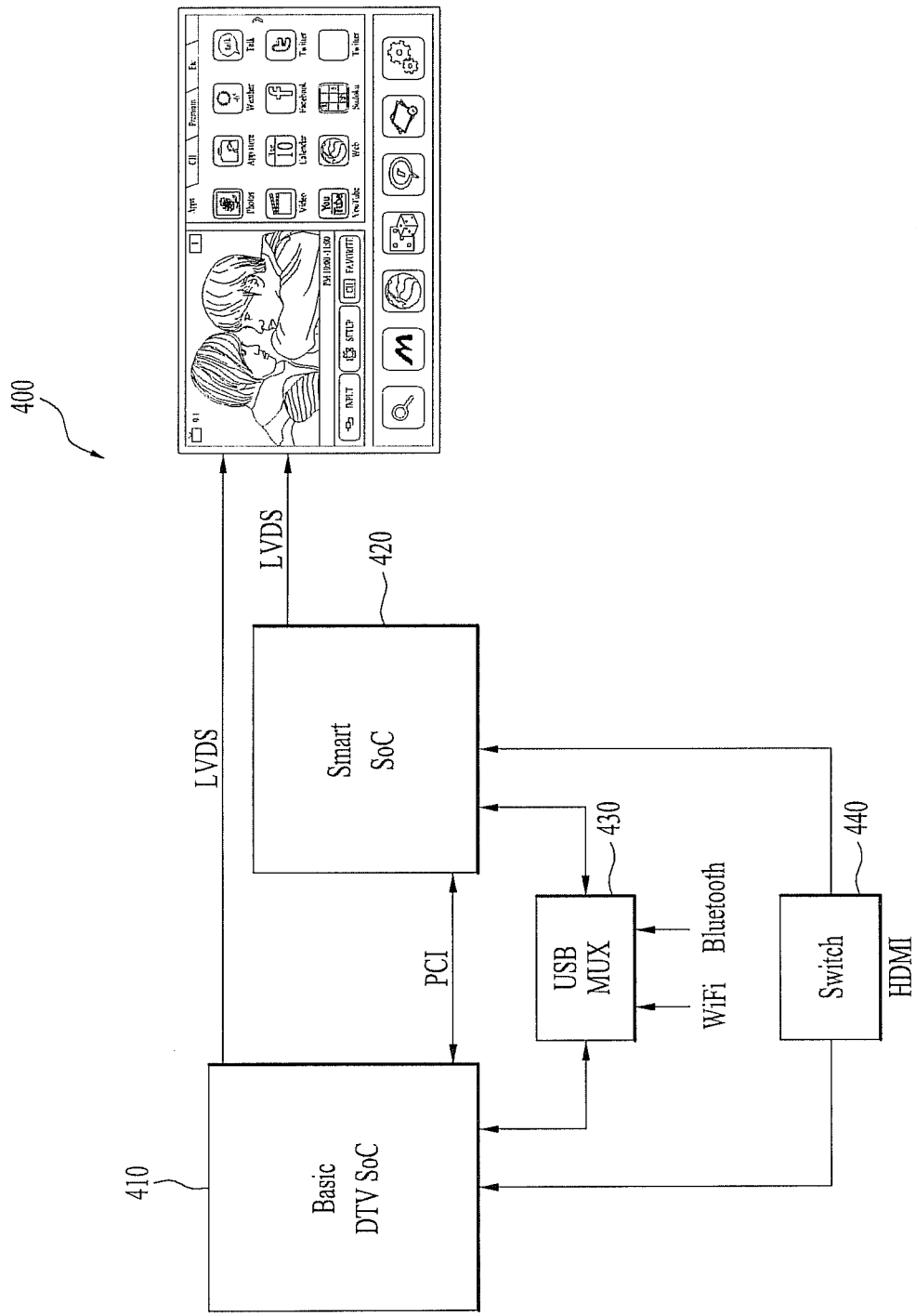
FIG. 4 is a block diagram of a display device equipped with a smart card according to one embodiment of the present disclosure.

FIG. 4 is a block diagram of functional blocks of a display device 400 equipped with a smart card according to one embodiment of the present disclosure. The display device 400 may include a controller 410 that is connected to a smart card 420. The controller 410 and upgrade device 420 may be an SoC.

The controller 410 may be configured in the form of an SoC and may include a central processing unit (CPU), a digital signal processor (DSP), and a micro control unit (MCU). The smart card 420 may also be configured in the form of an SoC. The smart card 420 can easily cope with upgrade functions or new standards since it is configured in the form of an SoC. Furthermore, it is possible to easily support a modified user experience (UX) and user interface (UI) of the display device through extended memory capacity.

Accordingly, the display device 400 can be operated by the controller 410 alone or the smart card 420 alone. Therefore, a specific function can be executed by the controller 410 or the smart card 420. This will be described below with reference to FIGS. 5 and 6.

Since the smart card 420 is separably connected to the display device 400, the controller 410 recognizes connection of the smart card 420 to the display device 400. When it is determined that the smart card 420 has an updated version, the smart functions need to be installed in the display device 400 or upgraded, and thus the smart card 420 is assigned control authority. Upon completion of upgrade of the display device 400, the control authority is returned to the controller 410.

While the control authority can be switched between the controller 410 and the smart card 420 to operate the display device 400, the controller 410 and the smart card 420 may complement each other to operate the display device 400 in terms of system efficiency. Accordingly, the controller 410 can control content to be displayed on the display device 400 and the smart card 420 can control updated content to be displayed on the display device 400, as shown in FIG. 4.

In this case, digital information can be transmitted to a display panel (corresponding to the display unit shown in FIG. 3) using a low voltage differential signaling (LVDS) cable. When LVDS is used, cable configuration is simplified because a set-top box and input/output terminals (composite, component, DVI, etc.) are directly connected in the display device. In addition, the LVDS supports USB, Ethernet LAN, HDMI, etc. as interfaces for communicating with external devices.

Particularly, upgraded content or upgraded graphics data can be directly transmitted from the smart card 420 to the display panel and displayed.

When there is an external device which is connected to the display device 400 through a USB MUX 430, the USB MUX 430 is switched to the controller 410 or the smart card 420 on the basis of the type of the external device or a function to be executed such that the controller 410 or the smart card 420 can perform the function. In addition, the display device 400 may include an additional switching module 440 to connect an external device, which is coupled to the switching module 440 through an HDMI cable, to the controller 410 or the smart card 420 such that the controller 410 or the smart card 420 can execute a specific function relating to the external device. Data transmission/reception between the controller 410 and the smart card 420 may be performed using a USB or PCI connection.

The control authority is switched between the controller 410 and the smart card 420 on the basis of functions classified into functions controlled by the controller 410 and functions controlled by the smart card 420 and stored in the memory unit. The memory unit can store the classified functions.

Figure 5:
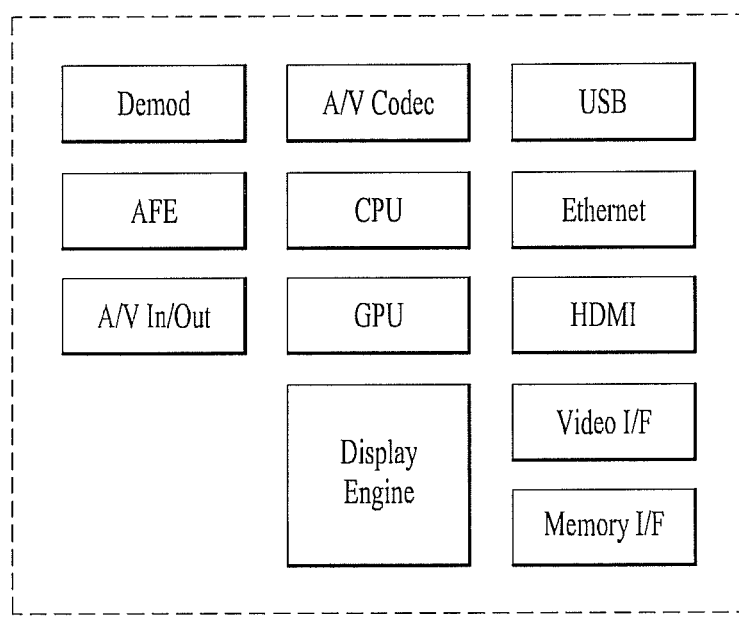
FIG. 5 is a block diagram of a system-on-chip (SoC) of a display device according to one embodiment of the present invention.

FIG. 5 is a block diagram of an SoC of a display device. As illustrated in FIG. 5, the display device may include modules for executing the broadcast reception function and the smart functions. These modules and corresponding functions are not shared with an upgrade device, e.g., an upgrade device is not connected to the display device. These modules are designed and developed along with the display device and controlled by the controller of the display device as necessary. Accordingly, it may be difficult to upgrade and update the display device having smart functions that are not separated.

Figure 6:
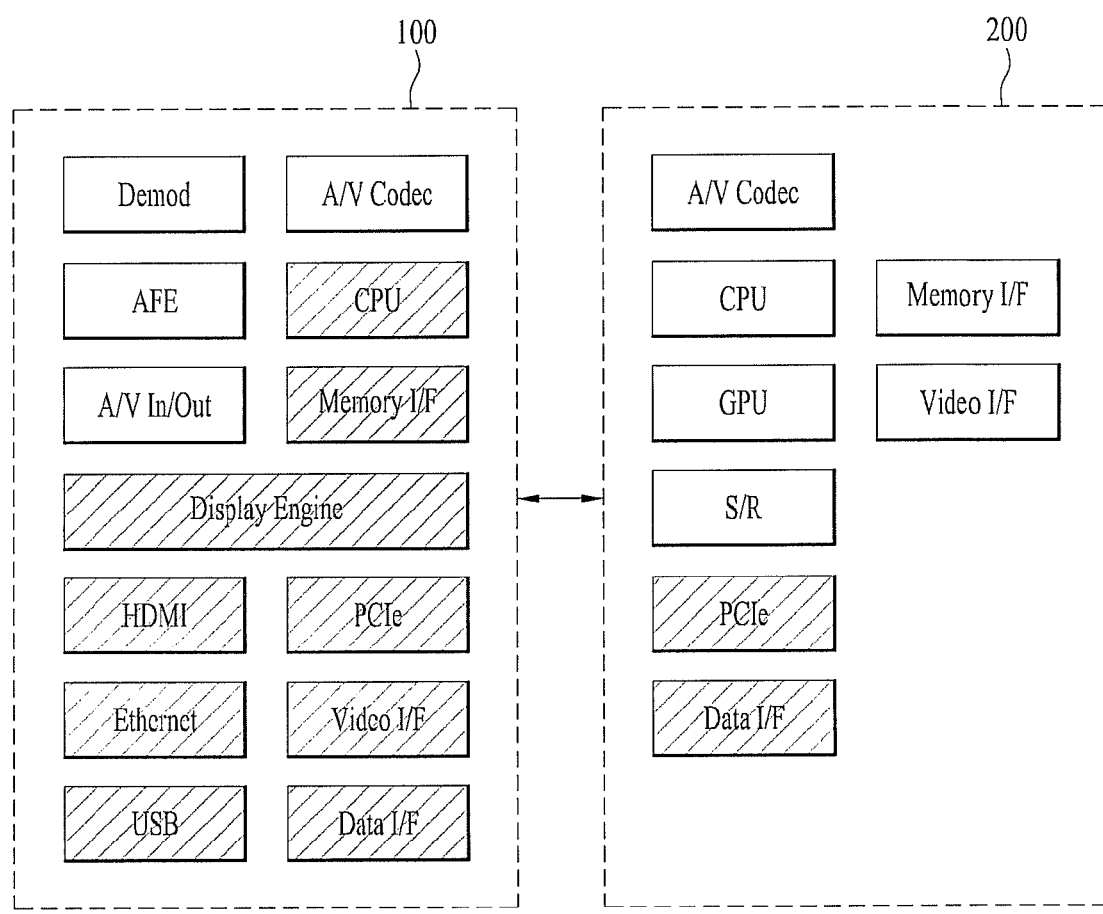
FIG. 6 is a block diagram of an SoC of a display device and an upgrade device having smart functions that are separated according to one embodiment of the present disclosure.

FIG. 6 is a block diagram of an SoC of a display device and an upgrade device having separable smart functions according to one embodiment of the present disclosure. The display device 100 that does not include the smart card 200 has only modules for executing a broadcast reception function and a broadcast display function. Accordingly, the display device 100 may employ a low-performance CPU.

Since the smart functions are separated from the display device 100, a peripheral component interconnect (PCI) module for communication between the display device 100 and the smart card 200 can be employed to connect the display device 100 and the smart card 200 to each other. By using PCI, it is possible to support not only PCI cards but also an ISA extension card which is currently the most widely used extension card.

The functional modules as shown in FIG. 6 are exemplary and the present disclosure is not limited thereto. Particularly, functions relating to the smart functions can be classified and stored such that the functions can be executed through the smart card 420. The configuration of the functional modules may be modified as functions are classified differently.

The smart card can include an analog signal processor and a digital signal processor. The digital signal processor can be replaced by an upgraded digital signal processor, which will now be described in detail with reference to FIGS. 7, 8 and 9.

Figure 7:
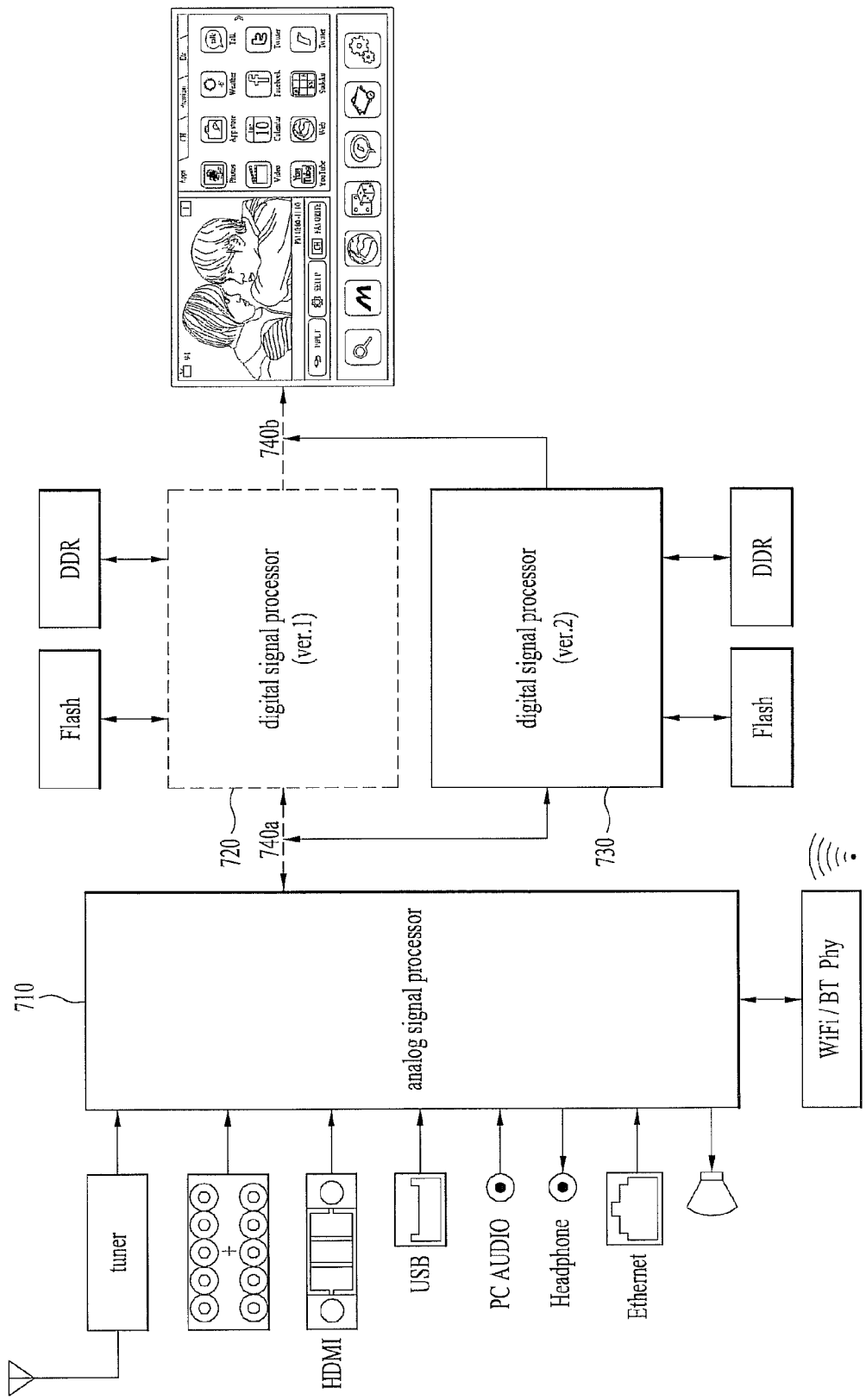
FIG. 7 is a block diagram of a smart card according to one embodiment of the present disclosure.

FIG. 7 is a block diagram of a smart card according to one embodiment of the present disclosure. The smart card may include an analog signal processor 710 and a digital signal processor 720. The analog signal processor 710 may include an input/output (I/O) jack. Accordingly, an interface can be simplified while maintaining the existing jack layout and change of SoC line-up can be minimized. The digital signal processor 720 can be replaced by an updated digital signal processor 730. The digital signal processors 720 and 730 may include a video demodulator, a transcoder, a CPU, a GPU, a DVR engine, an audio DSP, etc., and may further include a memory.

The memory stores firmware necessary to control and manage hardware of the display device or the smart card and can be implemented as a storage medium such as a flash ROM, DDR, or the like. Firmware adapted to the display device is stored in the memory and shipped when the upgrade device is shipped, and the digital signal processor 730 having an updated version may be released with updated firmware.

In this case, it is possible to enable modular SoC design by standardizing an interface 740*a* between the analog signal processor 710 and the digital signal processors 720 and 730 and an interface 740*b* between the digital signal processors 720 and 730 and a display panel and embedding the standardized interfaces 740*a* and 740*b* in an SoC.

When the updated digital signal processor 730 is released, the obsolete digital signal processor 720 may be replaced by the updated digital signal processor 730 and discarded. The embodiments described with reference to FIGS. 8 and 9 describe utilization of a dated digital signal processor.

Figure 8:
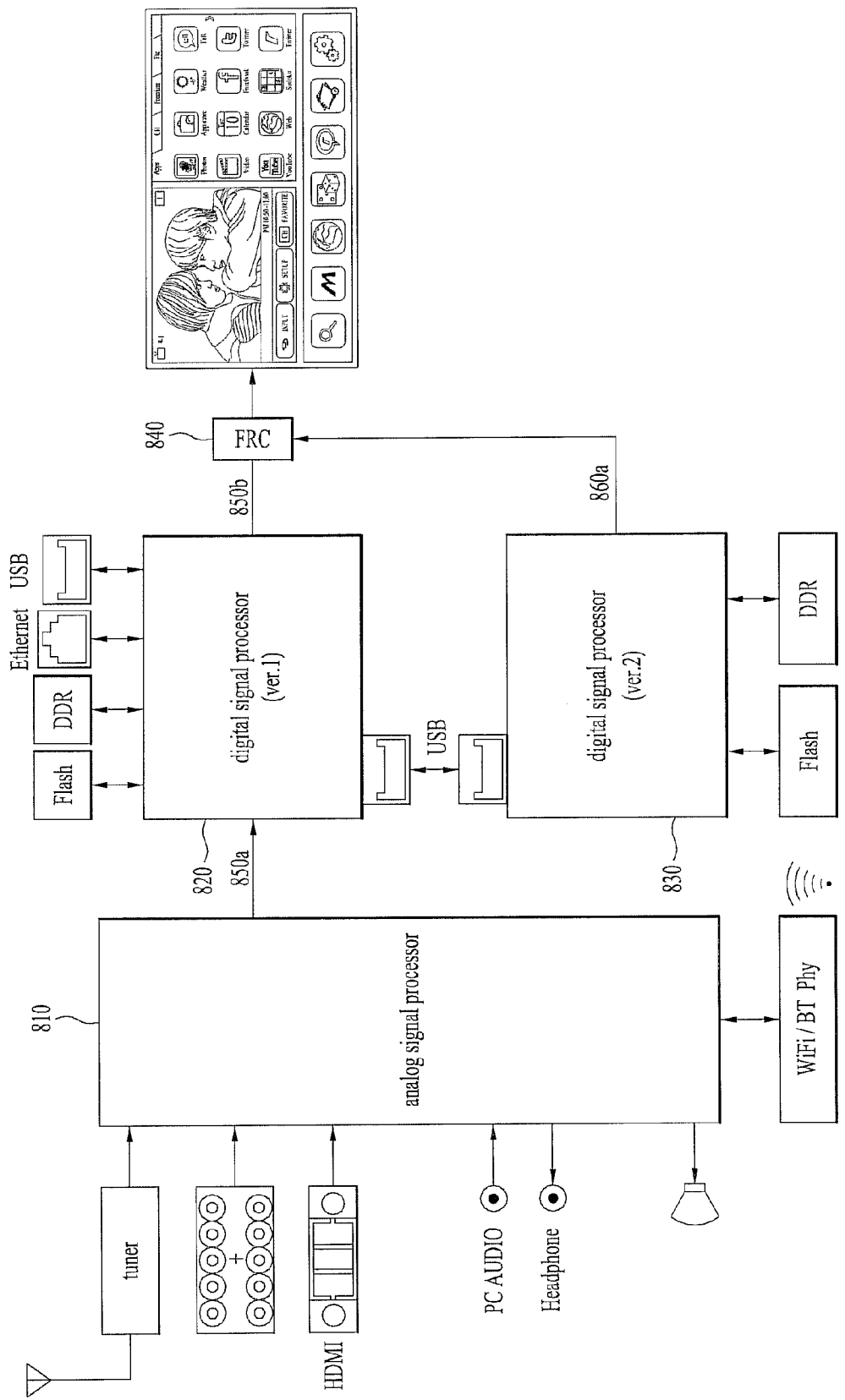
FIG. 8 is a block diagram of a smart card according to one embodiment of the present disclosure.

FIG. 8 is a block diagram of a smart card according to one embodiment of the present disclosure. Referring to FIG. 8, the smart card may include an analog signal processor 810 and a digital signal processor 820.

The analog signal processor 810 may include an input/output (I/O) jack. Accordingly, an interface can be simplified while maintaining the existing jack layout and change of SoC line-up can be minimized. The digital signal processors 820 may include a video demodulator, a transcoder, a CPU, a GPU, a DVR engine, an audio DSP, etc., and may further include a separate memory, an Ethernet terminal, a USB terminal or the like. The digital signal processor 820 can be replaced by an updated digital signal processor 830. Distinguished from the embodiment of FIG. 7, the digital signal processor 820 may be used to supplement the updated digital signal processor 830, for example, to optimize traffic to the updated digital signal processor 830 while being replaced by the updated digital signal processor 830.

Accordingly, an interface 850*a* between the analog signal processor 810 and the digital signal processor 820 and an interface 850*b* between the digital signal processor 820 and a display panel can be maintained. The obsolete digital signal processor 820 and the updated digital signal processor 830 may transmit/receive upgrade data through a USB port. The upgrade data can be directly transmitted to the display panel through a path 860*a* to be displayed as necessary.

In this case, it is possible to enable modular SoC design by standardizing the interface 850*a* between the analog signal processor 810 and the digital signal processors 820 and 830 and the interface 850*b* between the digital signal processors 820 and 830 and the display panel and embedding the standardized interfaces 850*a* and 850*b* in an SoC.

Figure 9:
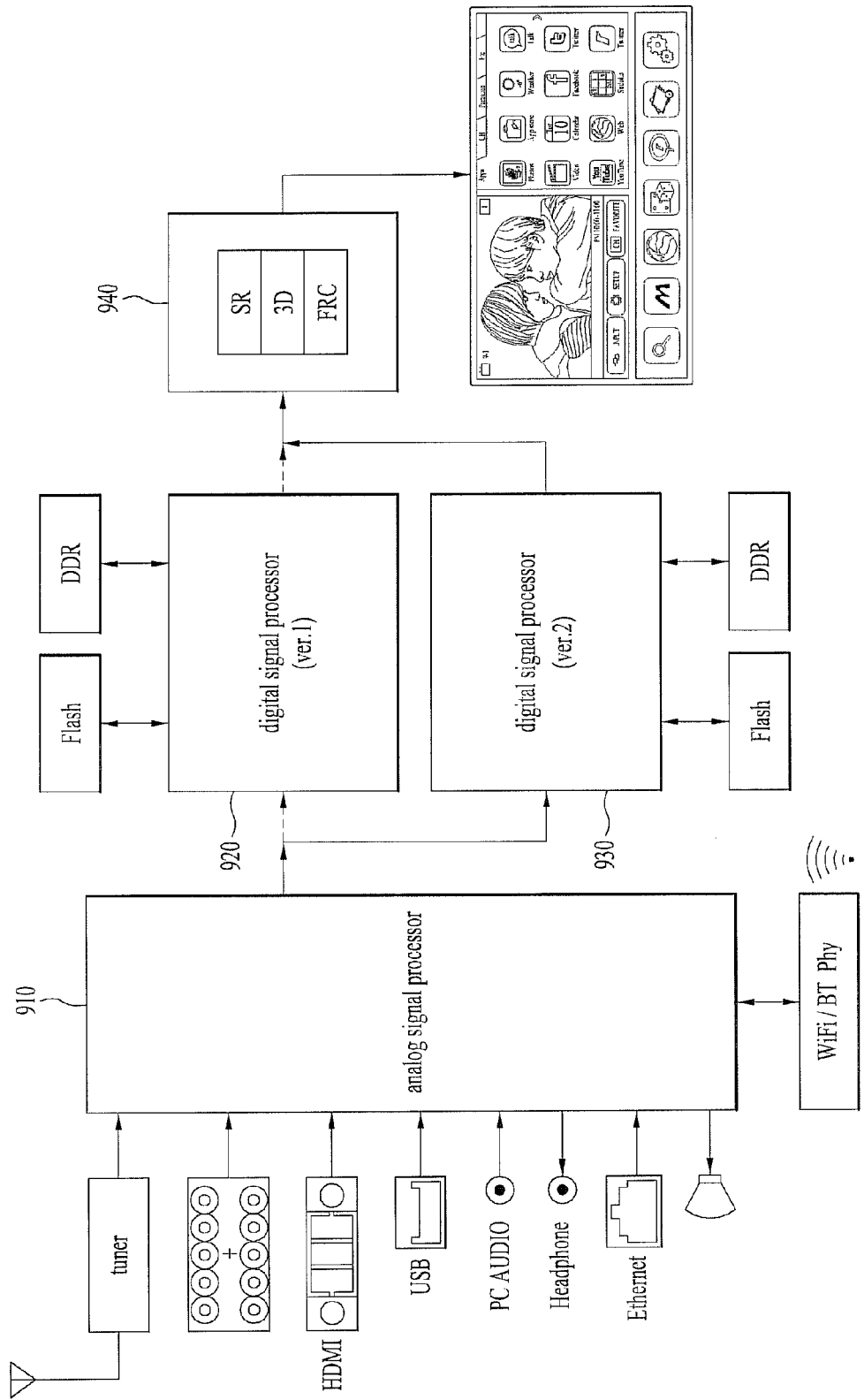
FIG. 9 is a block diagram of a smart card according to one embodiment of the present disclosure.

FIG. 9 is a block diagram of a smart card according to one embodiment of the present disclosure. The smart card includes an analog signal processor 910 and a digital signal processor 920.

The analog signal processor 910 may include an input/output (I/O) jack. Accordingly, an interface can be simplified while maintaining the existing jack layout and change of SoC line-up can be minimized. The digital signal processors 920 may include a video demodulator, a transcoder, a CPU, a GPU, a DVR engine, an audio DSP, etc., and may be replaced by an updated digital signal processor 930. The upgrade device of this embodiment can include a video processor 940 configured in the form of a chip, which processes graphics data prior to being displayed on a display panel. Accordingly, upgraded content can be displayed through the separate chip.

The video processor 940 can convert an output video signal such that the output video signal is adapted to a vertical frequency, resolution, aspect ratio or the like, corresponding to the output standard of the display panel. That is, it is possible to adjust a frame rate or process data to be displayed, such as processing for 3D images, through the video processor 940. Accordingly, functions performed by the digital signal processors 920 and 930 can be reduced so as to achieve more efficient upgrade.

Implementation of the smart functions through the smart card enables the display device to execute variable functions such as web browsing, SNS, game, etc., in addition to the broadcast reception function and may increase the number of applications available in the display device. This may increase the necessity of a remote controller to interface with the added functionality. The remote controller can employ Bluetooth, radio frequency (RF) communication, infrared (IR) communication, ultra wideband (UWB), ZigBee, etc. This will be described below with reference to FIGS. 10 and 11.

Figure 10C:
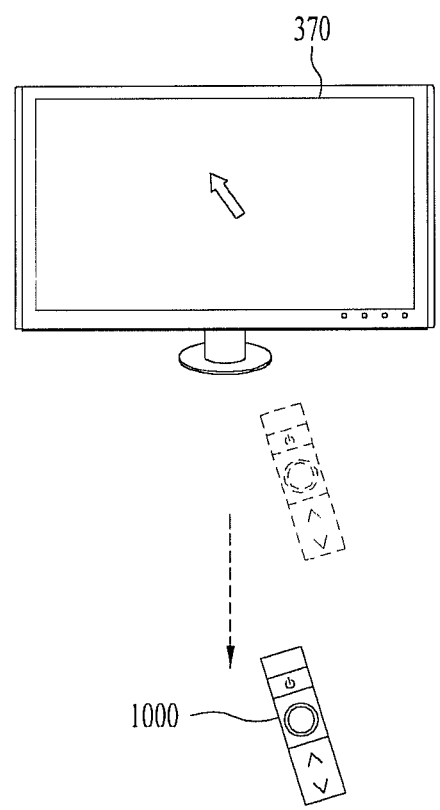

FIGS. 10A to 10C are diagrams that illustrate an operation of a remote controller for controlling a display device according to an embodiment of the present disclosure. As illustrated in FIG. 10A, a pointer 1001 corresponding to the remote controller 1000 may be displayed on the display 370 of the display device. The display 370 shown in FIG. 10 may correspond to the display of the display device shown in FIG. 3.

The remote controller 1000 may be moved up and down and to the left and right (FIG. 10B), the remote controller 1000 may be moved back and forth (FIG. 10C), or the remote controller 1000 may be rotated. The pointer 1001 displayed on the display unit 370 may indicate motion of the remote controller 1000. The remote controller 1000 can be referred to as a spatial remote controller since the pointer 1001 is moved along with motion of the remote controller 1000 in a 3D space.

FIG. 10B illustrates that the pointer 1001 displayed on the display 370 may move to the left when the user moves the remote controller 1000 to the left. Information about a motion of the remote controller 1000, sensed by a sensor of the remote controller 1000, may be transmitted to the display device 300. The display device 300 can compute coordinates of the pointer 1001 from the information about the motion of the remote controller 1000. The display device 300 can display the pointer 1001 at the computed coordinates.

FIG. 10C illustrates a case in which the remote controller 1000 is moved away from the display 370 while pressing a specific button of the remote controller 1000. In this case, a selected region on the display 370, which corresponds to the pointer 1001, may be zoomed in and magnified. Conversely, when the remote controller 1000 is moved closer to the display 370, the selected region on the display 370, which corresponds to the pointer 1001, may be zoomed out and reduced. Therefore, the smart function performed by the display device can be selected rapidly and conveniently by using the remote controller 1000, as illustrated in FIG. 10.

Figure 11:
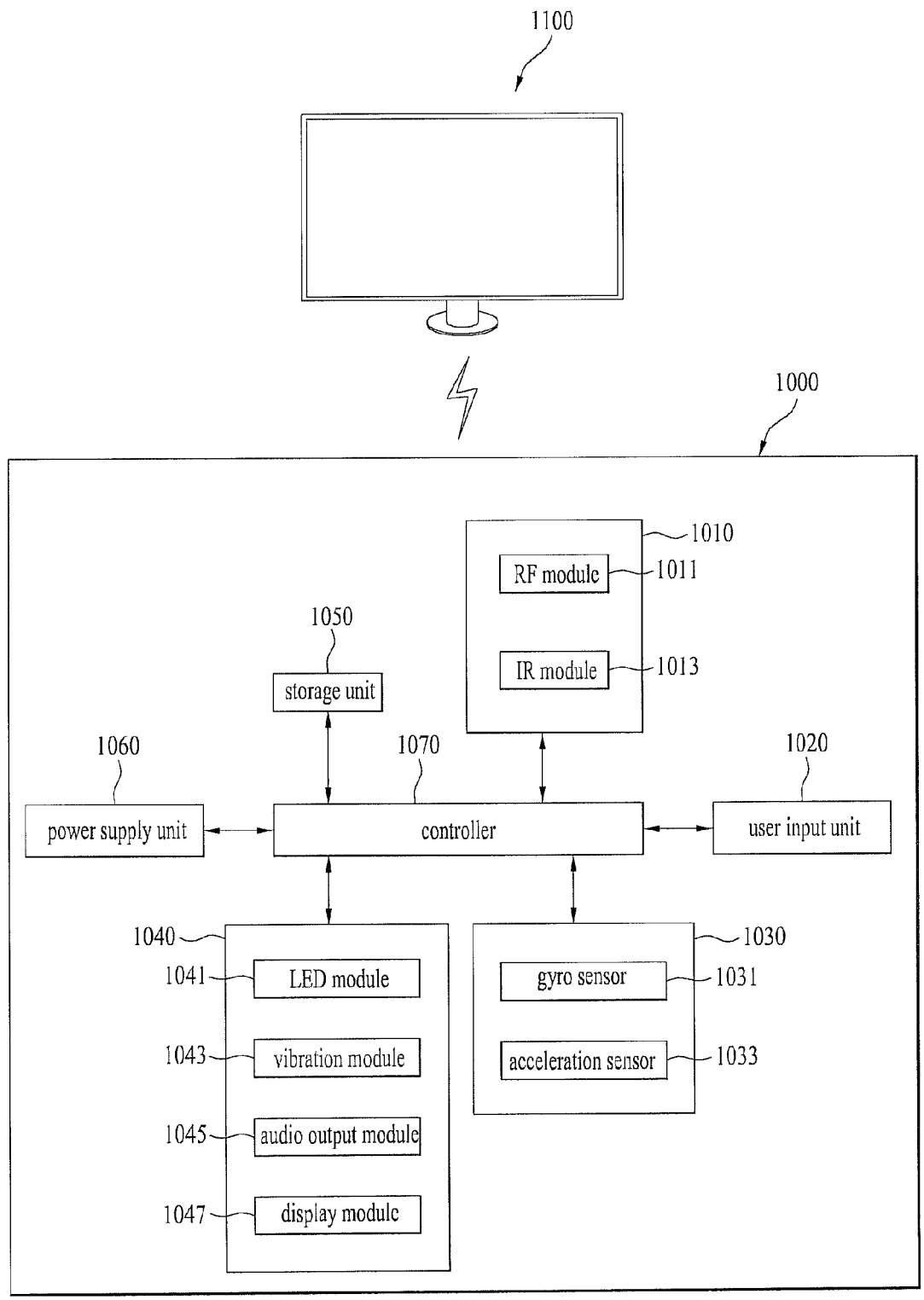
FIG. 11 illustrates a configuration of the remote controller shown in FIG. 10.

FIG. 11 is a block diagram of the remote controller 1000 of FIG. 10. The remote controller 1000 may include an RF communication unit 1010, a user input unit 1020, a sensor unit 1030, an output unit 1040, a storage unit 1050, a power supply unit 1060, and a controller 1070. The RF communication unit 1010 may transmit/receive signals to/from the above-mentioned display device.

The remote controller 1000 may include an RF module 1011 capable of transmitting/receiving signals to/from a display device 1100 according to an RF communication protocol. In addition, the remote controller 1000 may include an IR module 1013 capable of transmitting/receiving signals to/from the display device 1100 according to an IR communication protocol.

The remote controller 1000 may transmit a signal including information regarding motion of the remote controller 1000 to the display device 1200 through the RF module 1011. The remote controller 1000 can receive a signal transmitted from the display device 1100 through the RF module 1011. The remote controller 1000 can transmit a power on/off command, a channel change command, a volume change command, etc., to the display device 1000 through the IR module 1013 as necessary.

The user input unit 1020 can be configured as a keypad, buttons, a touch pad, a touchscreen or another appropriate type of input interface. The user can input a command relating to the display device 1100 to the remote controller 1000 by operating the user input unit 1020. The sensor unit 1030 may include a gyro sensor 1031 or an acceleration sensor 1033.

For example, the gyro sensor 1031 can sense information about operation of the remote controller 1000 on the basis of x, y and z axes. The acceleration sensor 1033 can sense information about a moving speed of the remote controller 1000. The sensor unit 1030 may further include a distance measurement sensor to sense a distance between the remote controller 1000 and the display device 1100.

The output unit 1040 can output a video signal or an audio signal corresponding to an operation of the user input unit 1020 or a signal transmitted from the display device 1100. The user can recognize whether the user input unit 1020 is operated or whether the display device 1100 is controlled through the output unit 1040.

For example, the output unit 1040 can include an LED module 1041 which is turned on, a vibration module 1043 generating vibration, a sound output module 1045 outputting sound, or a display module 1047 displaying an image, when the user input unit 1020 is operated or a signal is transmitted/received between the output unit 1040 and the display device 1100.

The storage unit 1050 can store various programs necessary for control or operation of the remote controller 1000, application data, etc. If the remote controller 1000 transmits/receives an RF signal to/from the display device 1100 through the RF module 1011, the remote controller 1000 and the display device 1100 may transmit/receive the RF signal through a predetermined frequency band.

The power supply unit 1060 provides power to the remote controller 1000. The power supply unit 1060 can interrupt power supply when the remote controller 1000 is not moved for a predetermined time to reduce power waste. The power supply unit 1060 can resume power supply when a predetermined key of the remote controller 1000 is operated.

The controller 1070 may control the overall operation of the remote controller 1000. The controller 1070 can transmit a signal corresponding to a predetermined key operation of the user input unit 1020 or a signal corresponding to motion of the remote controller 1000, which is sensed by the sensor unit 1030, to the display device 1100 through the RF communication unit 1010.

Figure 12:
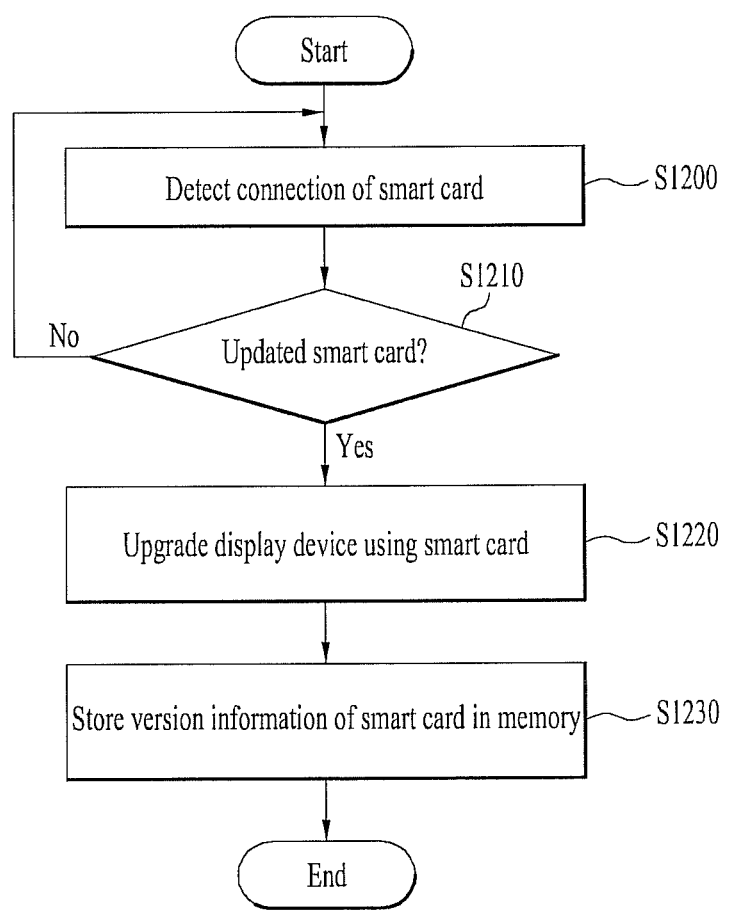
FIG. 12 is a flowchart illustrating a method for controlling a display device capable of upgrading smart functions according to an embodiment of the present disclosure.

FIG. 12 is a flowchart of a method for controlling a display device capable of upgrading smart functions according to one embodiment of the present disclosure. A connection of an upgrade device is detected, in step S1200. For example, display device that executes a broadcast reception function and a function of displaying a received broadcast signal may receive a signal representing connection of a smart card to the display device. It is determined whether the smart card connected to the display device has an updated version, in step S1210.

Upon reception of the signal that represents connection of the smart card to the display device, smart card information stored in a memory may be read. The memory stores information regarding the last smart card connected to the display device. If a smart card has never been connected to the display device, a predetermined value can be stored in the memory to indicate that a smart card has never been connected to the display device.

When it is determined that the smart card connected to the display device has an updated version, the display device is upgraded using the smart card, in step S1220. For the upgrade, the authority to control the display device can be assigned to the smart card such that the smart card can upgrade the display device. In one embodiment, the display device may receive upgrade data from the smart card using a USB connection rather than assigning the control authority to the smart card.

The smart card can upgrade functions of the display device, which are related to the smart functions. Accordingly, the display device can be efficiently upgraded since the smart functions, which are separate from the display device, can be executed through the smart card.

Furthermore, the smart card can be implemented in the form of an SoC which can be removably connected to the display device. The smart card may include hardware or software for upgrading the hardware or software of the display device. Accordingly, the smart card can include at least one of content for implementing the smart functions in the display device, control data for controlling the smart functions or graphics data. Upgraded content or upgraded graphics data can be directly transmitted from the smart card to the display panel of the display device and displayed on the display panel.

As described above, the display device can execute the smart functions in addition to the broadcast reception function by connecting the smart card to the display device, and thus the display device can function as a smart TV. Therefore, it is possible to use a display device capable of executing updated functions by changing the smart card connected to the display device without changing the SoC of the display device.

When the smart card having the updated version is connected to the display device, version information of the updated smart card may be stored in the memory such that data previously stored in the memory is replaced by the upgrade data of the updated smart card, in step S1230.

Figure 13:
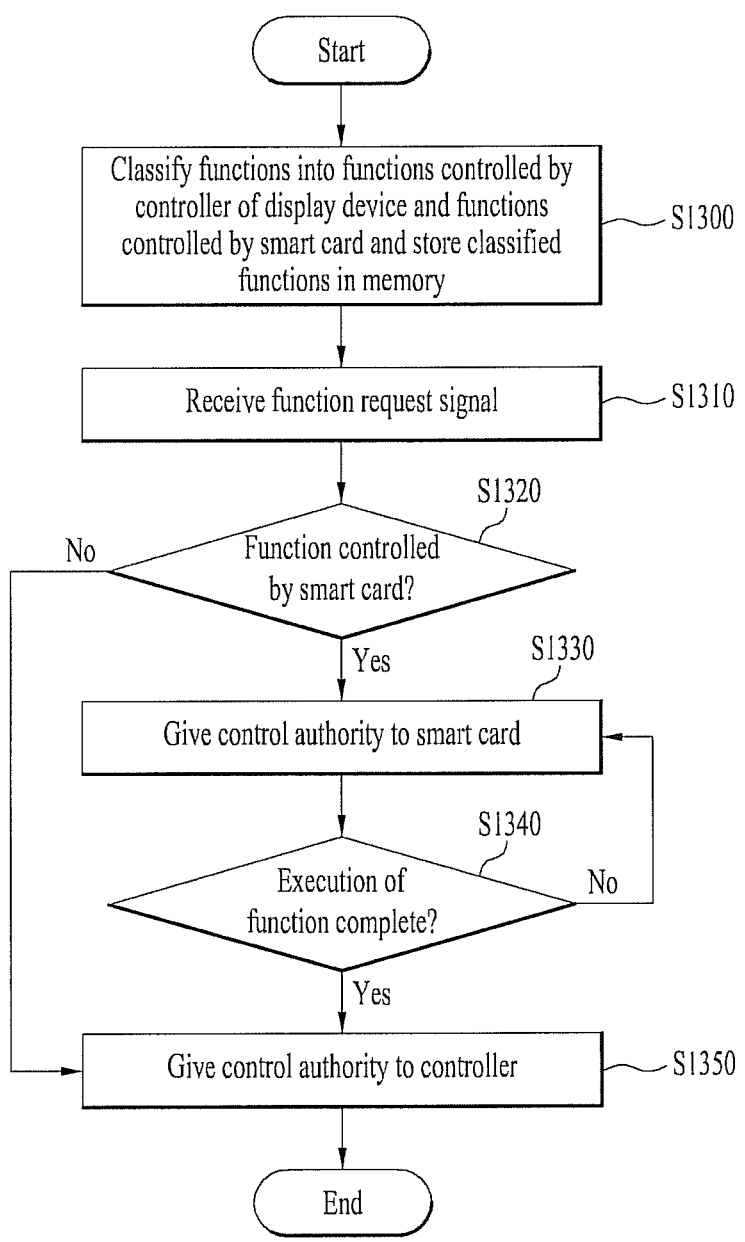
FIG. 13 is a flowchart illustrating a method for controlling a display device capable of upgrading smart functions according to another embodiment of the present disclosure.

FIG. 13 is a flowchart illustrating a method for controlling a display device capable of upgrading smart functions according to another embodiment of the present disclosure.

Functions executed in the display device may be classified into functions controlled by the controller of the display device and functions controlled by the smart card and stored in the memory, in step S1300. When a signal for requesting a function is received, in step S1310, it is determined whether the function corresponds to a function controlled by the smart card with reference to the memory, in step S1320. When the requested function corresponds to a function controlled by the smart card, the control authority is switched from the controller of the display device to the smart card, in step S1330. It is determined whether the requested function has been executed using the smart card, in step S1340. Upon completion of execution of the function, the control authority is switched to the controller of the display device from the smart card, in step S1350.

As described above, the smart functions are separated from other functions and the SoC of the display device is developed and upgraded by classifying functions into functions executed by the display device and functions executed by the smart card. The control authority may be assigned between the controller of the display device and the smart card on the basis of the functions. Accordingly, the display device can be efficiently upgraded and used.

As broadly described and embodied herein, a multi-functional display device capable of upgrading smart functions may include a broadcast receiver for receiving a broadcast signal, a demultiplexer for demultiplexing the received broadcast signal, a decoder for decoding the demultiplexed broadcast signal, a display for displaying the decoded broadcast signal, an external device interface configured to connect to a smart card for receiving upgrade data, a memory for storing the upgrade data and version information of the smart card, and a controller configured to process and display the received broadcast signal on the display, determine whether the smart card is connected to the display device, and communicate with the smart card to operate the multi-functional display device, wherein the smart card includes at least one smart function for execution on the multi-functional display device.

The smart card may include at least one of an upgraded hardware or an upgraded software for upgrading a hardware or software of the multi-functional display device. The smart card may include at least one of content for implementing the smart function of the display device, control data for controlling the multi-functional display device or graphics data. The smart card may be implemented in the form of a system-on-chip (SoC).

The controller may be configured to assign control authority to the smart card to upgrade a smart function of the multi-functional display device in response to the determination that the smart card may connected to the multi-functional display device and a determination that the smart card has an updated version. The external device interface may receive the upgrade data using a universal serial bus (USB) connection. The display may receive upgraded content or upgraded graphics data from the smart card to display the received content or graphics data.

The smart card may include an analog signal processor and a digital signal processor, the digital signal processor being replaceable by an upgraded digital signal processor. The memory may store functions for the multi-functional display device classified into functions controlled by the controller and functions controlled by the smart card, and the controller is configured to assign the control authority to the smart card based on the classification of the stored functions.

In one embodiment, a method for controlling a multi-functional display device capable of upgrading smart functions may include determining whether a smart card may connected to the display device, comparing version information of the connected smart card with version information stored in a memory of the multi-functional display device, upgrading at least one of a smart function, a hardware or a firmware of the multi-functional display device using the connected smart card when the connected smart card has an update for the at least one of a smart function, a hardware or a firmware of the multi-functional display device, and storing the version information of the connected smart card in the memory.

The method may include assigning authority to control the multi-functional display device to the smart card to upgrade the display device through the smart card. The method of upgrading the multi-functional display device using the smart card may include adding at least one new smart function for the display device.

The smart card may include at least one of an upgraded hardware or an upgraded software for upgrading a hardware or software of the multi-functional display device. The smart card may include at least one of content for implementing the smart function of the display device, control data for controlling the display device or graphic data. The smart card may include an SoC. The smart card may include an analog signal processor and a digital signal processor, the digital signal processor being replaceable by an upgraded digital signal processor.

The method of the upgrading the multi-functional display device using the smart card may include upgrading the multi-functional display device using upgrade data received from the smart card through a USB connection. The method may further include receiving upgraded content or upgraded graphics data from the smart card, and displaying the received upgraded content or upgraded graphic data. The method may further include classifying functions of the multi-functional display device into functions controlled by a controller of the display device and functions controlled by the smart card and storing the classified functions in the memory, and assigning control authority to the smart card based on the classification of a function requested for execution in the display device with reference to the memory. Moreover, a computer readable recording medium may be provided to store a program for executing the method.

In one embodiment, a display device capable of upgrading smart functions may include a broadcast receiver for receiving a broadcast signal; a demultiplexer for demultiplexing the received broadcast signal; a decoder for decoding the demultiplexed broadcast signal; a display unit for displaying the decoded broadcast signal; an external device interface for receiving upgrade data from a smart card; a memory for storing the upgrade data and version information of the smart card; and a controller for controlling the received broadcast signal to be processed and displayed on the display unit, checking whether the smart card is connected to the display device and a version of the smart card, and controlling operation of the smart card.

In one embodiment, a method for controlling a display device capable of upgrading smart functions may include receiving a signal representing connection of a smart card to the display device; comparing version information of the connected smart card with version information of a previous smart card, stored in a memory; upgrading the display device using the smart card when the connected smart card has been updated; and storing the version information of the connected smart card in the memory.

The method for controlling the display device according to the present disclosure can be embodied as computer readable code on a computer readable medium. The computer readable medium is any data storage device that stores data which can be read by a computer system. Examples of the computer readable medium include read-only memory (ROM), random-access memory (RAM), CD-ROM, magnetic tape, floppy disk, optical data storage devices, and so on. The computer readable medium can also be embodied in the form of carrier waves as signals communicated over the Internet. The computer readable medium can also be distributed over a network of coupled computer systems so that the computer readable code is stored and executed in a distributed fashion.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An upgradable display device, comprising:
   a device configured to be removably connected to the upgradable display device and comprising upgrade data configured to provide at least one additional function to the upgradable display device;
   a broadcast receiver configured for receiving a broadcast signal;
   a demultiplexer configured for demultiplexing the received broadcast signal;
   a decoder configured for decoding the demultiplexed broadcast signal;
   a display configured for displaying the decoded broadcast signal;
   an external device interface configured to connect to the device;
   a spatial remote controller including a gyro sensor for sensing user input for operating the upgradable display device; and
   a controller configured to
       process the received broadcast signal for display on the display,
       determine whether the device is connected to the upgradable display device via the external device interface, and
       upgrade the upgradable display device using the upgrade data received from the device,
       wherein the upgrade data includes data for at least one of On Screen Data (OSD) correction, new audio device effect, standby power reduction algorithm, software bug correction or support for modified user experience (UX) and user interface (UI) of the upgradable display device,
   wherein the controller is further configured to communicate with the device to operate the upgradable display device including assigning authority to the device for controlling the upgradable display device for execution of the at least one additional function on the upgradable display device, and
   the device comprises an analog signal processor, and a first digital signal processor and a second digital signal processor having an updated version with respect to the first digital signal processor, where the first digital signal processor supplements the second digital signal processor by optimizing traffic to the second digital signal processor.

2. The upgradable display device of claim 1, wherein the device includes at least one of
   content for implementing the upgraded functions of the upgradable display device, control data for controlling the upgradable display device, or graphics data.

3. The upgradable display device of claim 1, wherein the device is implemented in the form of a system-on-chip (SoC).

4. The upgradable display device of claim 1, wherein the controller of the upgradable display device is configured to assign control authority to the device to upgrade an upgradable function of the upgradable display device in response to the determination that the device is connected to the upgradable display device and a determination that the device has an updated version with respect to upgrade version information stored in a memory of the upgradable display device.

5. The upgradable display device of claim 1, wherein the external device interface is configured to receive the upgrade data using a universal serial bus, USB, connection.

6. The upgradable display device of claim 1, wherein the upgradable display device is configured to receive upgraded content or upgraded graphics data from the device to display the received upgraded content or upgraded graphics data.

7. The upgradable display device of claim 1, further comprising a memory configured to store the upgrade data and version information of the device and to store functions for the upgradable display device classified into functions to be controlled by the controller of the upgradable display device and functions to be controlled by the device, wherein the controller is configured to assign the control authority to the device to control a function of the upgradable display device based on the classification of the function as stored in the memory.

8. A method for controlling an upgradable display device, the method comprising:
   detecting a connection of a device configured to be removably connected to the upgradable display device and comprising upgrade data configured to provide at least one additional function to the upgradable display device;
   sensing user input for operating the upgradable display device via a spatial remote controller including a gyro sensor;
   determining whether a version of the device connected to the upgradable display device is an updated version;
   upgrading the upgradable display device using the upgrade data received from the device;
   communicating, by a controller internal to the upgradable display device with the connected device to operate the upgradable display device; and
   assigning authority to the device for controlling the upgradable display device for execution of the at least one additional function on the upgradable display device;
   wherein the upgrade data includes data for at least one of On Screen Data (OSD) correction, new audio device effect, standby power reduction algorithm, software bug correction and/or support for modified user experience (UX) and user interface (UI) of the upgradable display device,
   wherein the controller is further configured to communicate with the device to operate the upgradable display device including assigning authority to the device for controlling the upgradable display device for execution of the at least one additional function on the upgradable display device, and
   the device comprises an analog signal processor, a first digital signal processor and a second digital signal processor having an updated version with respect to the first digital signal processor, where the first digital signal processor supplements the second digital signal processor by optimizing traffic to the second digital signal processor.

9. The method of claim 8, wherein the upgrading the upgradable display device using the device includes assigning authority to control the upgradable display device to the device to upgrade the upgradable display device through the device.

10. The method of claim 9, wherein the upgrading the upgradable display device using the device includes adding at least one new upgradable function for the upgradable display device.

11. The method of claim 9, wherein the device includes at least one of:
   content for implementing the at least one additional function of the upgradable display device,
   control data for controlling the upgradable display device; or
   graphics data.

* * * * *